(12) United States Patent  
Tsai et al.

(10) Patent No.: US 8,708,540 B2  
(45) Date of Patent: Apr. 29, 2014

(54) BACKLIGHT MODULE WITH HEAT DISSIPATION STRUCTURE

(75) Inventors: Hsin-Tse Tsai, Hsin-Chu (TW);  
Chiao-Chih Yang, Hsin-Chu (TW);  
Po-Chun Huang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 258 days.

(21) Appl. No.: 13/040,271

(22) Filed: Mar. 4, 2011

(65) Prior Publication Data

US 2011/0286235 A1 Nov. 24, 2011

(30) Foreign Application Priority Data

May 18, 2010 (TW) .................................. 99115786

(51) Int. Cl.  
*F21V 7/22* (2006.01)  
*F21V 7/00* (2006.01)  
*G02F 1/1335* (2006.01)

(52) U.S. Cl.  
USPC ........... 362/606; 362/294; 362/561; 362/611; 362/612

(58) Field of Classification Search  
USPC .................................. 362/606, 612, 613, 633  
See application file for complete search history.

(56) References Cited

U.S. PATENT DOCUMENTS

| | | | | |
|---|---|---|---|---|
| 5,477,422 A | * | 12/1995 | Hooker et al. | ................... 362/29 |
| 5,805,251 A | * | 9/1998 | Ozawa | ............................ 349/110 |
| 6,768,532 B1 | * | 7/2004 | Sekiguchi | ..................... 349/153 |
| 7,663,730 B2 | * | 2/2010 | Shibata | ......................... 349/161 |
| 2004/0246696 A1 | * | 12/2004 | Yoo | .................................. 362/27 |
| 2007/0109788 A1 | * | 5/2007 | Pan | .................................. 362/294 |
| 2007/0268724 A1 | * | 11/2007 | Pan et al. | ....................... 362/633 |
| 2008/0063342 A1 | * | 3/2008 | Ono et al. | ........................ 385/88 |
| 2009/0096958 A1 | * | 4/2009 | Matsuura et al. | ............... 349/70 |
| 2009/0310362 A1 | * | 12/2009 | Weij | .......................... 362/249.02 |
| 2010/0001395 A1 | * | 1/2010 | Wang et al. | .................... 257/706 |
| 2010/0027296 A1 | * | 2/2010 | Hamada | ....................... 362/632 |

FOREIGN PATENT DOCUMENTS

| | | |
|---|---|---|
| CN | 101044427 | 9/2007 |
| CN | 101583824 | 11/2009 |
| TW | M286937 | 2/2006 |
| TW | 200628918 | 8/2006 |
| TW | 200825555 | 6/2008 |
| TW | M351369 | 2/2009 |
| TW | M351370 | 2/2009 |
| TW | M353366 | 3/2009 |

OTHER PUBLICATIONS

"Office Action of Taiwan Counterpart Application" with English translation thereof, issued on Mar. 28, 2013, p1-p13, in which the listed references were cited.

* cited by examiner

*Primary Examiner* — Sikha Roy  
(74) *Attorney, Agent, or Firm* — Jianq Chyun IP Office

(57) ABSTRACT

A backlight module includes a back plate, a light guide plate, a heat insulation layer, a heat dissipation member, and a light source device. The back plate has a first surface, a second surface opposite to the first surface, and an opening passing through the back plate. The light guide plate is disposed on the first surface, the heat insulation layer is disposed on the second surface, and the heat dissipation member is disposed on the heat insulation layer. The light source device is connected to the heat dissipation member and protrudes from the first surface to face the light guide plate through the opening.

13 Claims, 3 Drawing Sheets

BACKLIGHT MODULE WITH HEAT DISSIPATION STRUCTURE

CROSS-REFERENCE TO RELATED APPLICATION

This application claims the priority benefit of Taiwan application serial no. 99115786, filed May 18, 2010. The entirety of the above-mentioned patent application is hereby incorporated by reference herein and made a part of this specification.

BACKGROUND OF THE INVENTION

1. Field of the Invention

The invention is related to an optical device, and in particular to a backlight module.

2. Description of Related Art

As the electronic industry prospers, flat panel displays have gradually replaced cathode ray tube displays to become the current mainstream product. Among the flat panel displays, liquid crystal displays (LCD) are more technologically matured and more popular. However, since a liquid display panel of an LCD does not emit light, a backlight module is disposed beneath the liquid display panel as a light source, so that display functions are achieved.

In a backlight module, a light emitting strip including a plurality of light emitting diodes (LED) is assembled on a back plate, and heat generated by the light emitting diodes is dissipated by the back plate when the light emitting diodes emit light. Hence, parts of the back plate closer to the LEDs have higher temperature, whereas parts of the back plate farther from the LEDs have lower temperature, so that bending and distortion of the back plate is caused by an uneven temperature distribution. Therefore, angles at which light from the LEDs enters the light guide plate deviate. Taiwan patent no. M286937, M351369, and Taiwan patent application publication no. 200628918 disclose technologies relevant to light source devices.

SUMMARY OF THE INVENTION

The invention provides a backlight module capable of reducing the degree of distortion of a back plate thereof caused by an uneven distribution of temperature.

Other objectives and advantages of the invention may be further understood from the technical features disclosed in the invention.

In order to achieve one, a part, or all of the above objectives or other objectives, a backlight module including a back plate, a light guide plate, a heat insulation layer, a heat dissipation layer, and a light source device is provided according to an embodiment of the invention. The back plate has a first surface, a second surface opposite to the first surface, and an opening passing through the back plate. The light guide plate is disposed on the first surface, the heat insulation layer is disposed on the second surface, and the heat dissipation member is disposed on the heat insulation layer. The light source device is connected to the heat dissipation member and protrudes from the first surface to face the light guide plate through the opening.

In summary, the embodiment or embodiments of the invention may have at least one of the following advantages. The light source device is not directly connected to the back plate, but is connected to the heat dissipation member disposed on the heat insulation layer. The heat insulation layer is capable of preventing heat generated by the light source device when emitting light from being conducted towards the back plate. Therefore, the degree of distortion of the back plate caused by an uneven temperature distribution is reduced, so that angles at which light from the light source device enters the light guide plate may not deviate due to distortion of the back plate.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
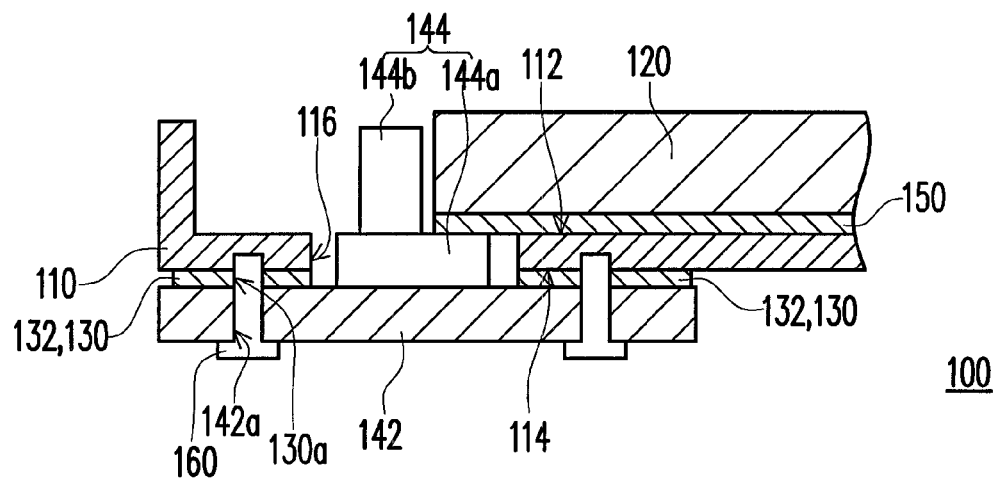
FIG. 1 is a partial schematic cross-sectional view of a backlight module according to an embodiment of the invention.
Figure 2:
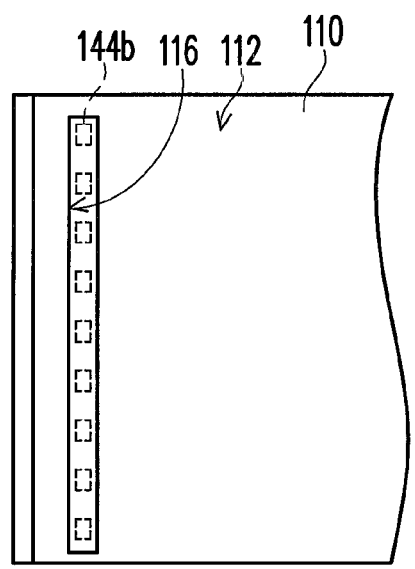
FIG. 2 is a schematic top view of a back plate in FIG. 1.

Please refer to both FIGS. 1 and 2. A backlight module 100 of the present embodiment includes a back plate 110, a light guide plate 120, a heat insulation layer 130, a heat dissipation member 142, a light source device 144, and a reflective plate 150. The back plate 110 has a first surface 112, a second surface 114 opposite to the first surface 112, and an opening 116 passing through the back plate 110. The light guide plate 120 is disposed on the first surface 112, the heat insulation layer 130 is disposed on the second surface 114, and the heat dissipation member 142 is disposed on the heat insulation layer 130. The reflective plate 150 is disposed between the light guide plate 120 and the back plate 110.

The light source device 144 is connected to the heat dissipation member 142 and protrudes from the first surface 112 to face the light guide plate 120 through the opening 116. By adopting such an arrangement, the heat insulation layer 130 disposed between the light source device 144 and the back plate 110 prevents heat generated by the light source device 144 when emitting light from being conducted to the back plate 110, so that a degree of distortion of the back plate 110 caused by an uneven temperature distribution is reduced. Hence, angles at which light from the light source device 144 enters the light guide plate 120 may not deviate due to distortion of the back plate 110. Heat generated by the light source device 144 when emitting light is transmitted outward through the heat dissipation member 142.

Please refer to FIG. 1. In detail, the heat insulation layer 130 according to the present embodiment includes two heat insulation strips 132 adhering to the second surface 114 and located at two sides of the opening 116. The material of the insulation strips 132 is, for example, an elastic material, so that a gap between the back plate 110 and the heat dissipation member 142 is filled due to the elastic property of the elastic material, thereby preventing external dust from entering the backlight module 100. In addition, the light source device 144 according to the present embodiment includes a substrate 144a and an LED 144b, wherein the LED 144b is, for example, a side view LED. The substrate 144a is connected to the heat dissipation member 142 and is aligned with the opening 116. The LED 144b is disposed on the substrate 144a and protrudes from the first surface 112 to face the light guide plate 120 through the opening 116, so that light emitted from the LED 144b is capable of entering the light guide plate 120.

Figure 3:
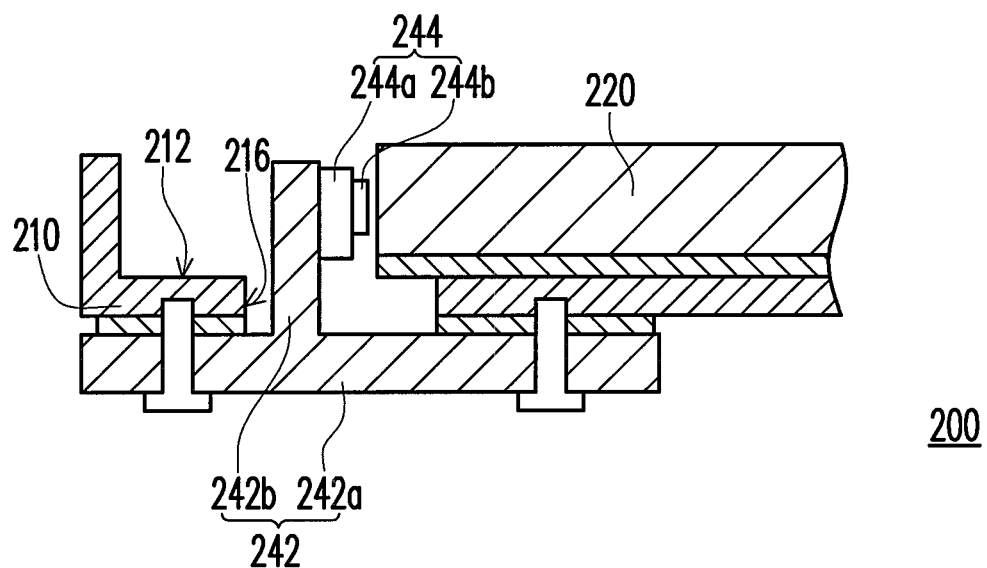
FIG. 3 is a partial schematic cross-sectional view of a backlight module according to another embodiment of the invention.

Nevertheless, the scope of the invention is not limited to the above configuration; a top view LED may be used in the invention. According to the embodiment shown in FIG. 3, a heat dissipation member 242 includes a first heat dissipation plate 242a and a second heat dissipation plate 242b. A light source device 244 includes a substrate 244a and an LED 244b. The LED 244b is, for example, a top view LED. The second heat dissipation plate 242b is integrally connected to the first heat dissipation plate 242a and protrudes from a first surface 212 of a back plate 210 through an opening 216. The substrate 244a is connected to the second heat dissipation plate 242b. The LED 244b is disposed on the substrate 244a and faces the light guide plate 220, so that light emitted from the LED 244b enters the light guide plate 220.

Figure 4:
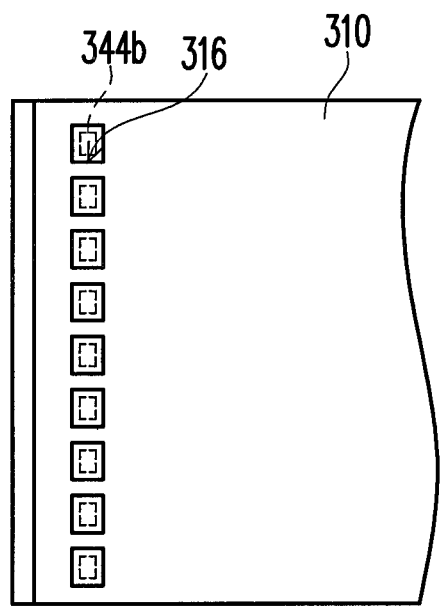
FIG. 4 is a schematic top view of a back plate according to another embodiment of the invention.

Please refer to FIG. 4. Compared with the opening 116 of the back plate 110 in FIG. 3, the opening 116 is a single and continuous opening to expose a plurality of LEDs 144b, a back plate 310 in FIG. 4 has a plurality of openings 316, and the openings 316 respectively expose a plurality of LEDs 344b. In the invention, the types of the opening 116 or openings 316 are not limited, so that the types of the openings may be of any suitable shapes and numbers.

In further detail, according to the embodiment in FIG. 1, the heat dissipation member 142 has a hole 142a, and the heat insulation layer 130 has a hole 130a aligned with the hole 142a, and the backlight module 100 further includes a fixation member 160. The fixation member 160 fixes the heat dissipation member 142 on the back plate 110 through the hole 142a and the hole 130a, so that the light source device 144 connected to the heat dissipation member 142 is fixed on the back plate 110. It should be noted that since the heat dissipation member 142, the light source device 144, and the back plate 110 are each an individual and independent structure, and the heat dissipation member 142 and the back plate 110 are assembled together by a fixation method, this configuration is advantageous for mass production and assembly and for enhancing the convenience in maintenance. In addition, fixation may be achieved by other methods elaborated in the following examples with the figures.

Figure 5:
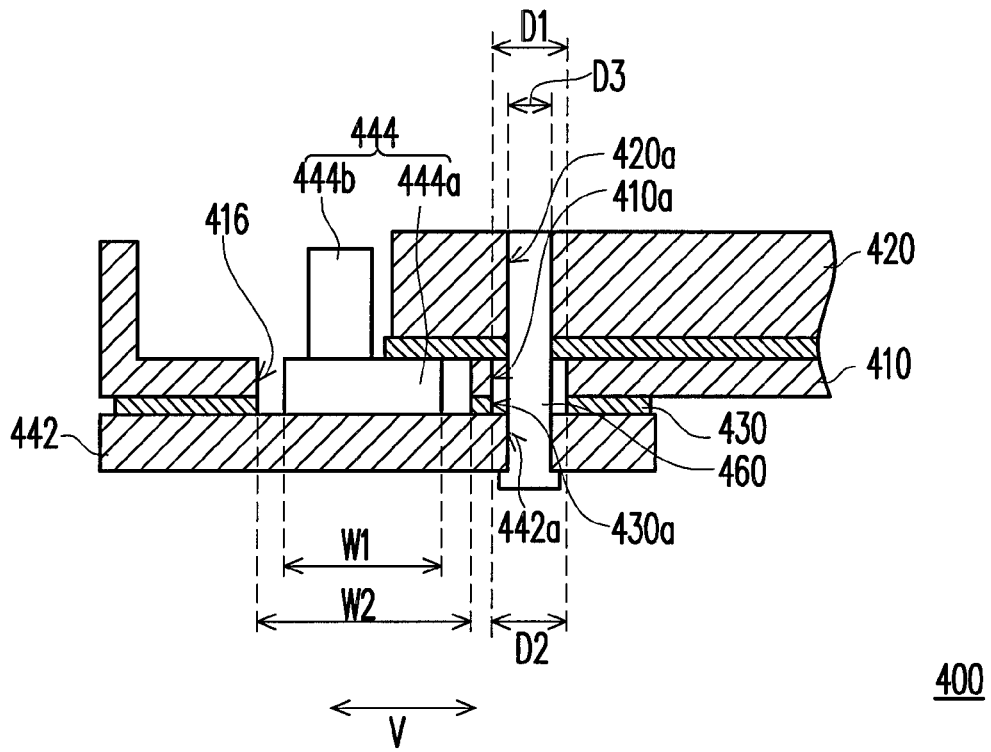
FIG. 5 is a partial schematic cross-sectional view of a backlight module according to another embodiment of the invention.

Please refer to FIG. 5. A backlight module 400 of the present embodiment includes a back plate 410, a light guide plate 420, a heat insulation layer 430, a heat dissipation member 442, and a light source device 444. The heat dissipation member 442 has a hole 442a, the heat insulation layer 430 has a hole 430a aligned with the hole 442a, and the back plate 410 has a hole 410a aligned with the hole 430a. A fixation member 460 fixes the heat dissipation member 442 on the light guide plate 420 through the hole 442a, the hole 430a, and the hole 410a, so that the light source device 444 connected to the heat dissipation member 442 is fixed on the light guide plate 420.

According to the present embodiment, a diameter D1 of the hole 410a and a diameter D2 of the hole 430a are designed to be greater than an outer diameter D3 of the fixation member 460, and a width W2 of an opening 416 of the back plate 410 is designed to be greater than a width W1 of the substrate 444a of the light source device 444. By adopting the above design, the heat dissipation member 442 and the light source device 444 connected to the heat dissipation member 442 are capable of moving along a direction V as the light guide plate 420 is deformed by heat. Hence, the LED 444b is not compressed due to the light guide plate 420 being deformed by heat. Therefore, a gap between the LED 444b and the light guide plate 420 in case the light guide plate 420 is deformed by heat is unnecessary, so that a coupling efficiency between the LED 444b and the light guide plate 420 is enhanced.

Figure 6:
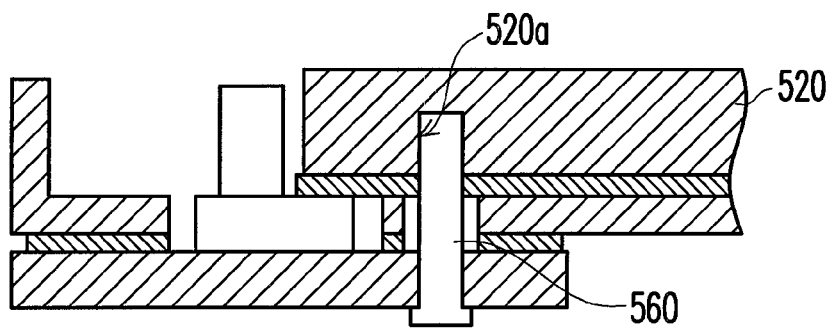
FIG. 6 is a partial schematic cross-sectional view of a backlight module according to another embodiment of the invention.

Compared with the fixation member 460 in FIG. 5 having an through hole 420a, and fixed into the through hole 420a, a light guide plate 520 in FIG. 6 has a blind hole 520a, wherein a fixation member 560 is fixed into the blind hole 520a. Nevertheless, the scope of the invention is not limited to the above configuration.

In summary, at least one of the above embodiments has at least one of the following advantages. The light source device is not directly connected to the back plate, but is connected to the heat dissipation member. The heat insulation layer exists between the heat dissipation member and the back plate, so that the heat insulation layer prevents heat generated by the light source device when emitting light from being conducted to the back plate. Therefore, the degree of distortion of the back plate caused by an uneven temperature distribution is reduced, so that angles at which light from the light source device enters the light guide plate may not deviate due to distortion of the back plate. Additionally, according to at least one embodiment of the invention, since the heat dissipation member and the back plate are each an individual and independent structure, and are assembled together by a fixation method, this configuration is advantageous for mass production and assembly and for enhancing the convenience in maintenance.

Furthermore, according to at least one of the embodiments of the invention, the heat dissipation member and the light guide plate are fixed to each other, and the heat dissipation member and the light source device are capable of moving relatively to the back plate, so that the light source device connected to the heat dissipation member is capable of shifting relatively to the back plate as the light guide plate is deformed by heat. Hence, the LED may not be compressed due to the light guide plate being deformed by heat. Therefore, a gap between the LED and the light guide plate in case the light guide plate is deformed by heat is unnecessary, so that the coupling efficiency between the LED and the light guide plate is enhanced. Moreover, the material of the heat insulation layer may be an elastic material, so that the gap between the back plate and the heat dissipation member is filled due to the elastic property of the elastic material, thereby preventing external dust from entering the backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:
1. A backlight module with heat dissipation structure, comprising:
   a back plate, having a first surface, a second surface opposite to the first surface, and an opening passing through the back plate;
   a light guide plate, disposed on the first surface;
   a heat insulation layer, disposed on the second surface;
   a heat dissipation member, disposed under the heat insulation layer without directly connected to the back plate; and
   a light source device, connected to the heat dissipation member and protruding from the first surface to directly face the light guide plate through the opening, wherein the light source device is capable of emitting light beams to the light guide plate.

2. The backlight module as claimed in claim 1, wherein a material of the heat insulation layer is an elastic material.

3. The backlight module as claimed in claim 1, wherein the light source device comprises:
   a substrate, connected to the heat dissipation member and aligned with the opening; and
   a light emitting diode, disposed on the substrate and protruding from the first surface to face the light guide plate through the opening.

4. The backlight module as claimed in claim 1, wherein the heat dissipation member comprises a first heat dissipation plate and a second heat dissipation plate, the second heat dissipation plate protrudes from the first surface through the opening, the light source device further comprising:
   a substrate, connected to the second heat dissipation plate; and
   a light emitting diode, disposed on the substrate and facing the light guide plate.

5. The backlight module as claimed in claim 4, wherein the first heat dissipation plate and the second heat dissipation plate are integrally formed.

6. The backlight module as claimed in claim 1, wherein the heat insulation layer comprises two heat insulation strips, and the two heat insulation strips adhere to the second surface and are located at two sides of the opening.

7. The backlight module as claimed in claim 1, wherein the heat dissipation member has a first hole, and the heat insulation layer has a second hole aligned with the first hole, the backlight module further comprising:
   a fixation member, fixing the heat dissipation member on the back plate through the first hole and the second hole.

8. The backlight module as claimed in claim 1, wherein the heat dissipation member has a first hole, and the heat insulation layer has a second hole aligned with the first hole, the back plate has a third hole aligned with the second hole, the backlight module further comprising:
   a fixation member, fixing the heat dissipation member on the light guide plate through the first hole, the second hole, and the third hole.

9. The backlight module as claimed in claim 8, wherein a diameter of the second hole is greater than an outer diameter of the fixation member, a diameter of the third hole is greater than the outer diameter of the fixation member, and a width of the opening is greater than a width of the light source device.

10. The backlight module as claimed in claim 8, wherein the light guide plate has a through hole, and the fixation member is fixed into the through hole.

11. The backlight module as claimed in claim 8, wherein the light guide plate has a blind hole, and the fixation member is fixed into the blind hole.

12. The backlight module as claimed in claim 1, further comprising a reflective plate, disposed between the light guide plate and the back plate.

13. The backlight module as claimed in claim 1, wherein the light source device is disposed beside one side of the light guide plate and the back plate is disposed beside another side of the light guide plate connected the afore cited side of the light guide plate.

* * * * *